(12) United States Patent
Lu et al.

(10) Patent No.: US 9,871,237 B2
(45) Date of Patent: Jan. 16, 2018

(54) WATERPROOF ACCOMMODATING STRUCTURE FOR BATTERY

(71) Applicant: LITE-ON TECHNOLOGY CORPORATION, Taipei (TW)

(72) Inventors: Shan-Yu Lu, Zhao Qing (CN); Ke-Cheng Wang, Guangdong (CN)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 247 days.

(21) Appl. No.: 15/011,744

(22) Filed: Feb. 1, 2016

(65) Prior Publication Data

US 2017/0084891 A1 Mar. 23, 2017

(30) Foreign Application Priority Data

Sep. 18, 2015 (CN) .......................... 2015 1 0599270

(51) Int. Cl.
*H01M 2/10* (2006.01)
*H01M 2/20* (2006.01)

(52) U.S. Cl.
CPC ....... *H01M 2/1094* (2013.01); *H01M 2/1027* (2013.01); *H01M 2/1055* (2013.01); *H01M 2/204* (2013.01); *H01M 2220/30* (2013.01)

(58) Field of Classification Search
CPC ........ H01M 2/08; H01M 2/1094; H01M 2/04; H01M 2/0404; H01M 2/0408; H01M 2/0413; H01M 2/0417; H01M 2/0426; H01M 2/0456; H01M 2/046; H01M 2/0465; H01M 2/0473; H01M 2/0478; H01M 2/0491; H01M 2/06; H01M 2/065
See application file for complete search history.

(56) References Cited

U.S. PATENT DOCUMENTS

| | | | | |
|---|---|---|---|---|
| 3,694,267 A * | 9/1972 | Angelovich | ............ | H01M 2/04 429/165 |
| 4,495,260 A * | 1/1985 | Hardigg | .................. | H01M 2/06 429/180 |
| 5,876,868 A * | 3/1999 | Tanida | ................ | H01M 2/0408 429/163 |
| 6,042,967 A * | 3/2000 | Sargeant | ............. | H01M 2/0421 429/163 |
| 8,544,670 B2 * | 10/2013 | Brilmyer | ............ | G11B 33/1406 109/33 |

(Continued)

*Primary Examiner* — Imran Akram
(74) *Attorney, Agent, or Firm* — Li & Cai Intellectual Property (USA) Office

(57) ABSTRACT

A battery-accommodating waterproof container includes a housing, a transmission base, a battery-holding seat and a locking cover module. The housing has a first opening, a second opening and a plurality of wedging holes. The transmission base is fixed on the first opening, and has a bottom board, an electricity transferring seat and a bottom-sealing element disposed between the bottom board and the housing. The battery-holding seat is received in the housing for receiving a battery therein. The electricity transferring seat transfers electricity of the battery outside the transmission base. The locking cover module is disposed on the second opening of the housing, and has a covering lid, a plurality of locking tabs and a pushing unit. The pushing unit drives the locking tabs to respectively wedge in the wedging holes of the housing, so as to retain the battery-holding seat in the housing.

13 Claims, 9 Drawing Sheets

(56) References Cited

U.S. PATENT DOCUMENTS

| | | | | |
|---|---|---|---|---|
| 2006/0257730 | A1* | 11/2006 | Suzuki | H01M 2/0275 429/175 |
| 2010/0136402 | A1* | 6/2010 | Hermann | H01M 2/1077 429/120 |
| 2011/0244279 | A1* | 10/2011 | Anglin | H01M 2/0235 429/56 |
| 2014/0322565 | A1* | 10/2014 | Kusama | H01M 2/365 429/53 |
| 2014/0349143 | A1* | 11/2014 | Ogura | H01M 2/08 429/7 |
| 2015/0050169 | A1* | 2/2015 | Horie | B08B 3/026 417/410.1 |
| 2015/0214520 | A1* | 7/2015 | Nishikawa | B25F 5/02 429/100 |

* cited by examiner

WATERPROOF ACCOMMODATING STRUCTURE FOR BATTERY

BACKGROUND OF THE INVENTION

1. Field of the Invention

The instant disclosure is related to a waterproof accommodating structure for battery. In particular, the instant disclosure relates to an accommodating structure for receiving a battery therein with a water-proof function, which can be combined in an electronic device to provide electric power, and the battery is replaceable.

2. Description of Related Art

Most electronic devices need a battery for providing electric power, such as wireless keyboard, wireless handheld transceiver (walkie talkie), portable outdoor light or alarm device . . . etc. When such electronic devices are used outdoor or in a humid environment, the water-proof function is critical.

A conventional battery-receiving seat usually was hermetically sealed, and used a plurality of screws to fix a covering lid to an accommodating housing for receiving a battery. A sealing ring is disposed between the covering lid and the accommodating housing to block moisture from entering the accommodating housing. However, such structure is not convenient to replace the battery, and it spends too much time removing the screws. The removed screws are easily lost or fallen on the ground, especially in outdoors, so as to make much inconvenient usage.

Moreover, moisture still is possibly permeated into the accommodating housing from gaps, and the short circuit or electrodes corrosion of battery may happen.

SUMMARY OF THE INVENTION

It is one objective of this invention to provide a waterproof accommodating structure for a battery, which can conveniently replace the battery to save time, in addition, even moisture is permeated, a safeguarding configuration is provided.

In order to achieve the above objectives, according to one exemplary embodiment of the instant disclosure, the instant disclosure provides a waterproof accommodating structure for a battery, which includes a housing, a transmission seat, a battery-holding seat and a locking cover module. The housing is hollow-shaped, and includes a first opening, a second opening opposite to the first opening, and a plurality of wedging holes close to the second opening. The transmission seat is fixed in the first opening of the housing, and the transmission seat has a base board, an electricity transferring seat disposed on the base board, and a base-sealing element is arranged between the base board and the housing. The battery-holding seat is received in the housing. The battery-holding seat has a receiving portion for receiving at least one battery, an output terminal set is arranged at one end of the receiving portion, a water-proofing section disposed at the other end of the receiving portion opposite to the output terminal set, and a top-end portion connected to the water-proofing section. The electricity transferring seat is electrically connected to the output terminal set and transmits electricity to an outside of the transmission seat. The locking cover module is disposed on the second opening of the housing and against the top-end portion. The locking cover module has a covering lid, a plurality of latching bolts movably arranged under the covering lid, and a pressing unit passing through the covering lid. The pressing unit drives the latching bolts to wedge in the wedging holes of the housing, so as to block the battery-holding seat in the housing.

Thus, the instant disclosure has advantages as follows. The battery-accommodating waterproof container according to the instant disclosure can provide waterproof function, and the battery-holding seat is conveniently dismounted to replace a battery.

For further understanding of the instant disclosure, reference is made to the following detailed description illustrating the embodiments and examples of the instant disclosure. The description is for illustrative purpose only and is not intended to limit the scope of the claim.

DETAILED DESCRIPTION OF THE PREFERRED EMBODIMENTS

Figure 1:
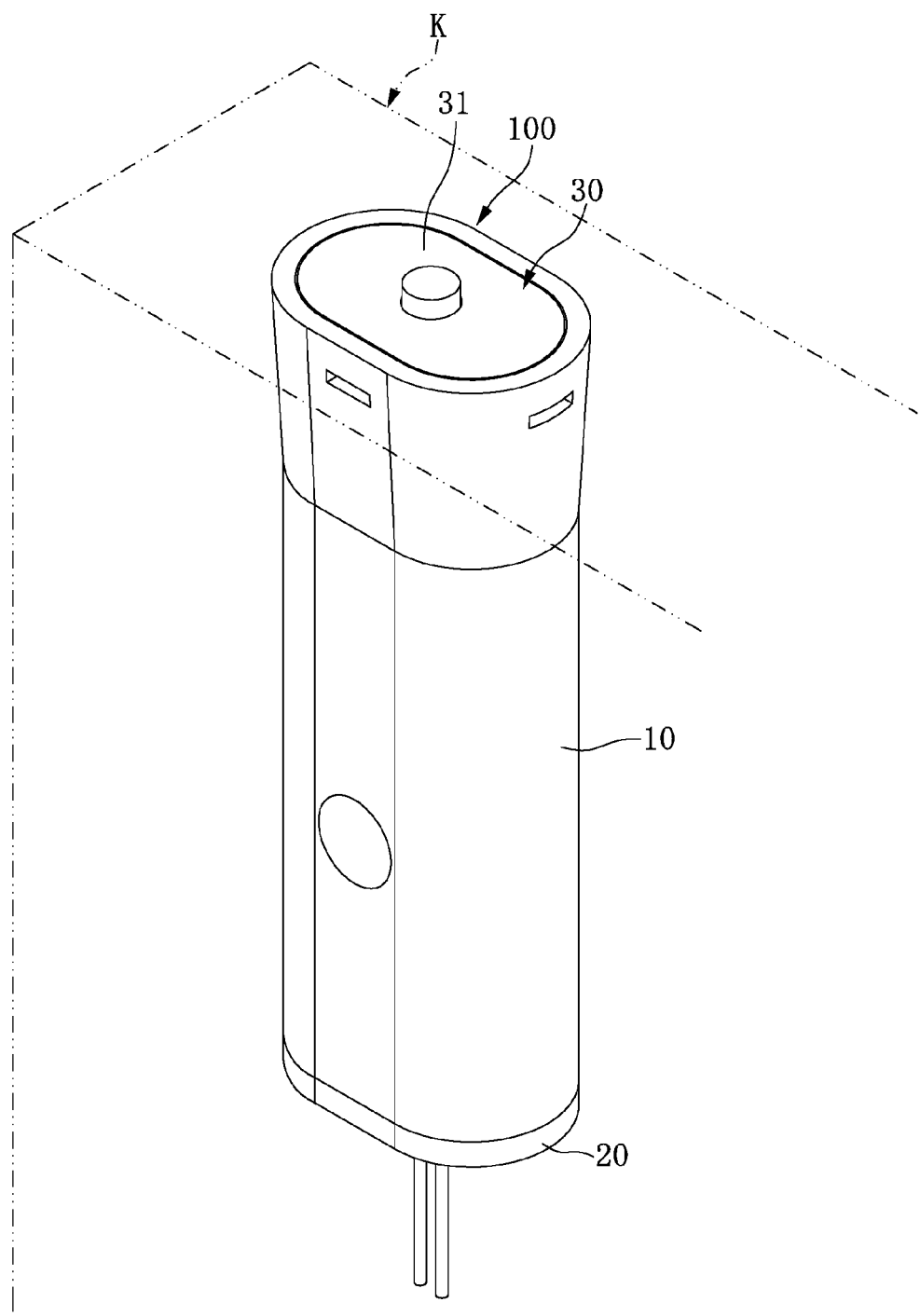
FIG. 1 is a perspective view of a waterproof accommodating structure for battery of the instant disclosure in an electronic device.

Refer to FIG. 1, which is a perspective view of a battery-accommodating waterproof container of the instant disclosure. The instant disclosure provided a battery-accommodating waterproof container 100, which can be utilized in any electronic products K requiring waterproofing, such as a keyboard, or handheld transceiver . . . etc.

Figure 2:
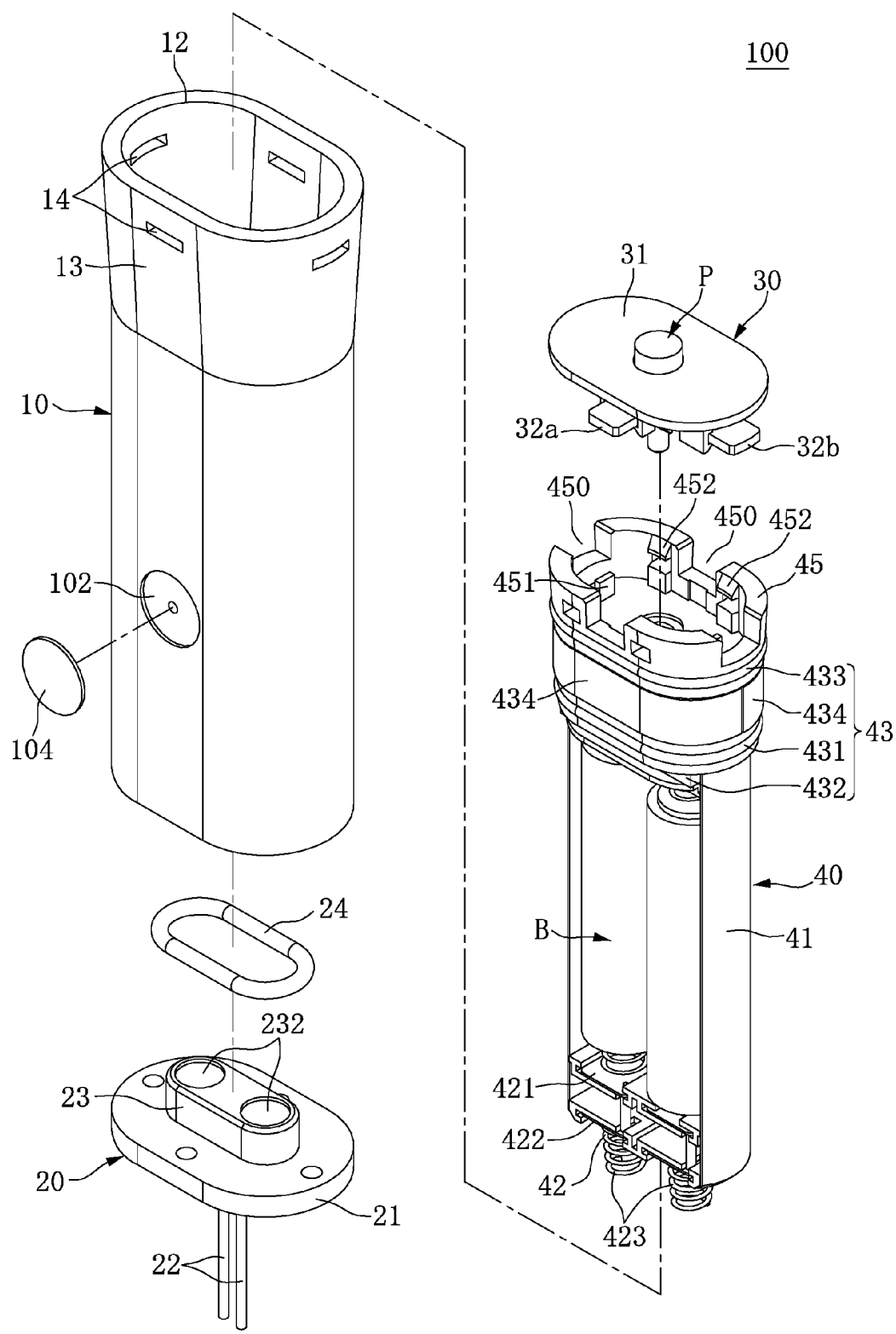
FIG. 2 is an exploded perspective view of a waterproof accommodating structure for battery of the instant disclosure.
Figure 3:
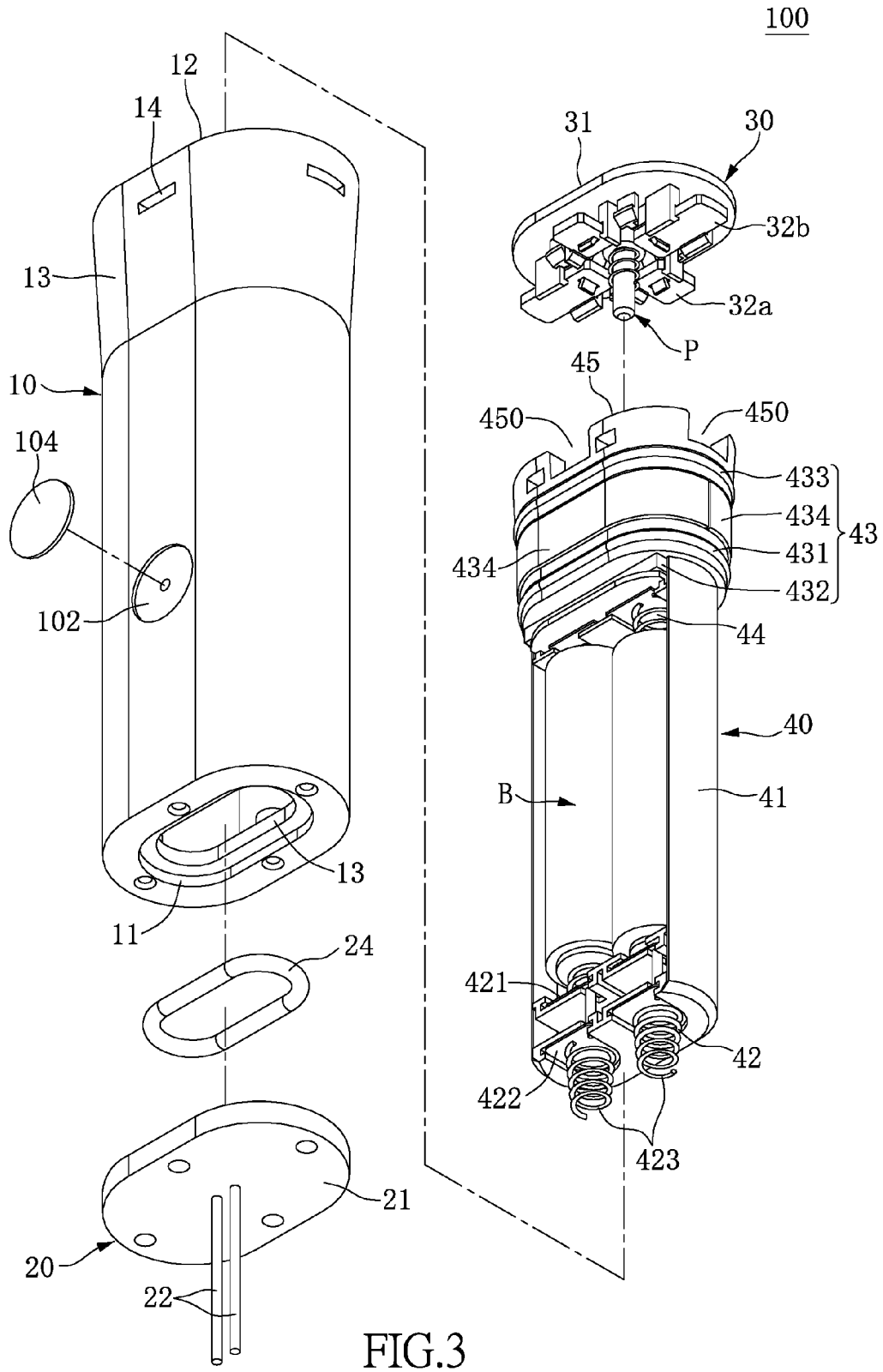
FIG. 3 is another exploded perspective view of a waterproof accommodating structure for battery of the instant disclosure.

Refer to FIG. 2 and FIG. 3, which are exploded views of a battery-accommodating waterproof container 100 of the present disclosure. The battery-accommodating waterproof container 100 includes a housing 10, a transmission seat 20 fixed at one end of the housing 10, a locking cover module 30 dismountably locked at the other end of the housing 10, and a battery-holding seat 40 received in the housing 10.

Figure 4:
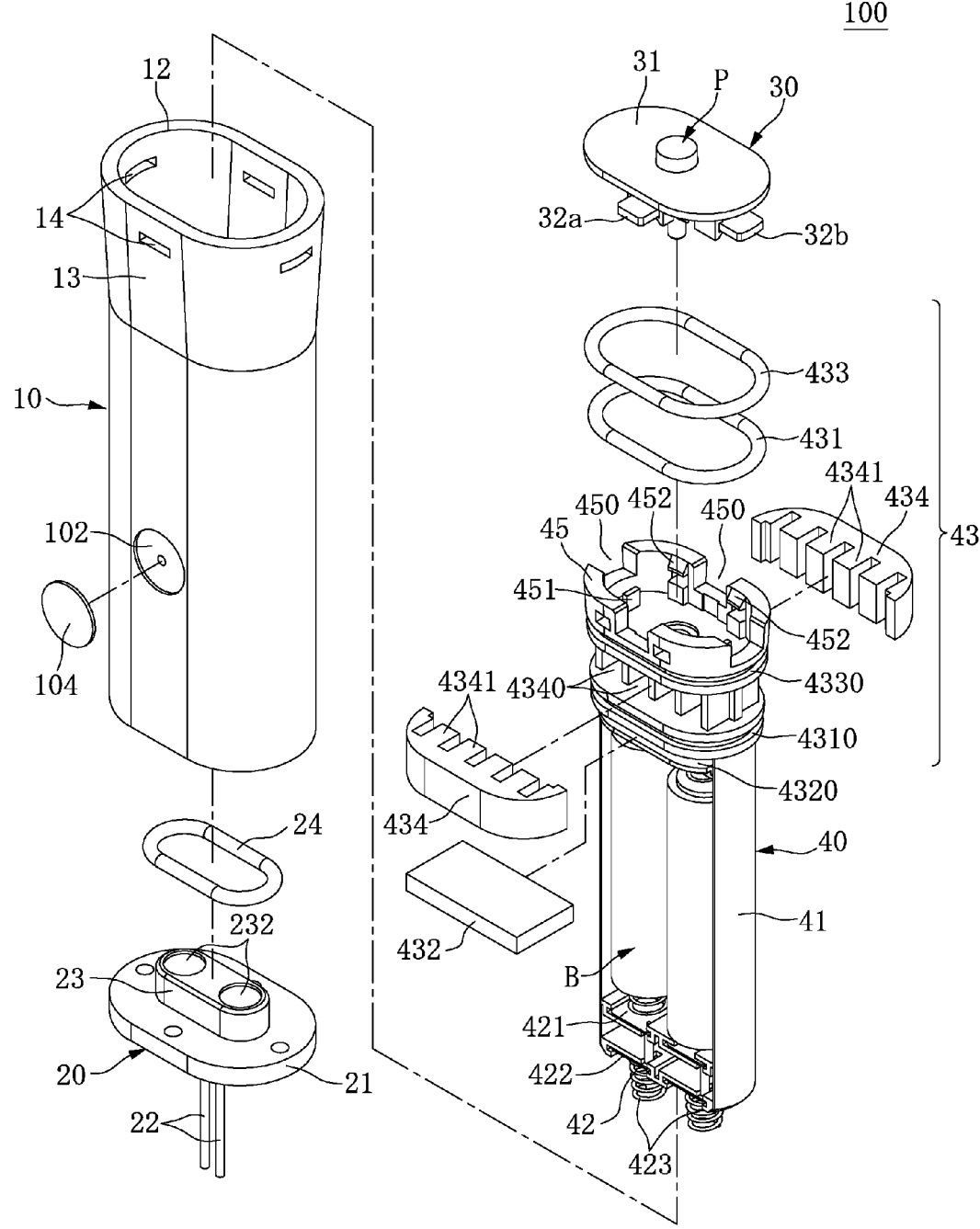
FIG. 4 is a further exploded perspective view of a waterproof accommodating structure for battery of the instant disclosure.

The housing 10 is hollow-shaped, which has a first opening 11 (as shown in FIG. 3), a second opening 12 opposite to the first opening 11 (as shown in FIG. 4), and a plurality of wedging holes 14 close to the second opening 12. In this embodiment, a lower part of the housing 10 is extended from the first opening 11 toward the second opening 12 with an identical bore, and another part is extended from an oblique portion 13 toward the second opening 12 with a gradually enlarged bore. The oblique portion 13 is formed with a substantial taper space therein, which can block the battery-holding seat 40 at a predetermined position. A periphery of the battery-holding seat 40 is tightly contacted with an inner surface of the oblique portion 13. In this embodiment, the housing 10 further includes a testing hole 102 for testing a water-tight effectiveness, and a sealing pad 104 covered on the testing hole 102. The housing 10 can be a part of the electronic product K, or an independent element assembled with the electronic product K.

Refer to FIG. 2 and FIG. 3, the transmission seat 20 is fixed to the first opening 11 of the housing 10 for transmitting electricity outside. The transmission seat 20 has a base board 21, an electricity transferring seat 23 arranged on the base board 21, and a base-sealing element 24 disposed between the base board 21 and the housing 10. The base-sealing element 24 is used to block moisture from entering the housing 10. The transmission seat 20 has a plurality of terminals 232 fixed in the electricity transferring seat 23, a wire set 22 arranged at an outer side of the base board 21 and electrically connected to the terminals 232.

Referring to FIG. 2 and FIG. 3, the locking cover module 30 is mounted to the second opening 12 of the housing 10 in a dismountable manner. When user removed the locking cover module 30 from the housing 10, the battery-holding seat 40 can be taken out from the second opening 12 to replace the battery B. The locking cover module 30 includes a covering lid 31, a plurality of latching bolts 32a, 32b movably arranged under the covering lid 31, and a pressing unit P passing through the covering lid 31. The pressing unit P can drive the latching bolts 32a, 32b to wedge into the wedging holes 14 of the housing 10, so as to block the battery-holding seat 40 in the housing 10. The locking cover module 30 will be introduced in detail later.

Referring to FIG. 2 and FIG. 3, the battery-holding seat 40 is received in the housing 10. The battery-holding seat 40 has a receiving portion 41 for receiving the battery B, an output terminal set 42, a water-proofing section 43, and a top-end portion 45. The output terminal set 42 is arranged at one end of the receiving portion 41, which is a bottom end of the receiving portion 41 as shown in FIG. 2. The water-proofing section 43 and the top-end portion 45 are arranged at the other end of the receiving portion 41 which is a top end of the receiving portion 41 as shown in FIG. 2. The top-end portion 45 is connected to the water-proofing section 43 and outwardly extended. The electricity transferring seat 23 is electrically connected to the output terminal set 42 and transmits the electric power out of the transmission seat 20. In this embodiment, the battery is column-shaped, such as AA size or AAA size. The battery-holding seat 40 further has a transit-terminal set 44 which is disposed at the other end of the receiving portion 41, as shown in FIG. 3. In more detail, the transit-terminal set 44 is arranged on a top surface of an inner part of the receiving portion 41, and the transit-terminal set 44 can receive two column-shaped batteries in series connection or in parallel connection. However, the transit-terminal set 44 can be omitted, for example, the transit-terminal set is not needed for a nine-volt square battery (or called as PP3 battery), and it can be omitted.

As shown in FIG. 2, the output terminal set 42 includes a plurality of internal terminals 421, external terminals 422, and a pair of elastic transmit-element 423. The internal terminals 421 contact with the battery B. The external terminals 422 are disposed at a bottom of the receiving portion 41 and connect the internal terminals 421 to the elastic transmit-element 423. The elastic transmit-element 423 is disposed at a bottom of the battery-holding seat 40 and elastically contacts the electricity transferring seat 23. The elastic transmit-element 423 is made of conductive material, for example, which can be a pressing spring, or an elastic terminal . . . etc. In this embodiment, the terminals 232 contact the pair of elastic transmit-elements 423. The pair of elastic transmit-elements 423 are electrically connected to the electricity transferring seat 23 and the output terminal set 42. The number of the elastic transmit-element 423 can be at least one.

Figure 5:
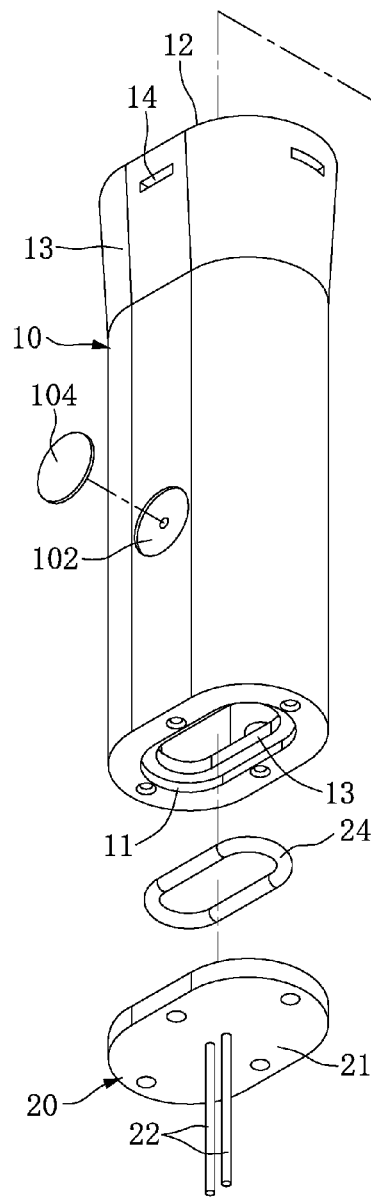
FIG. 5 is a further exploded perspective view of a waterproof accommodating structure for battery in another view of the instant disclosure.
Figure 5:
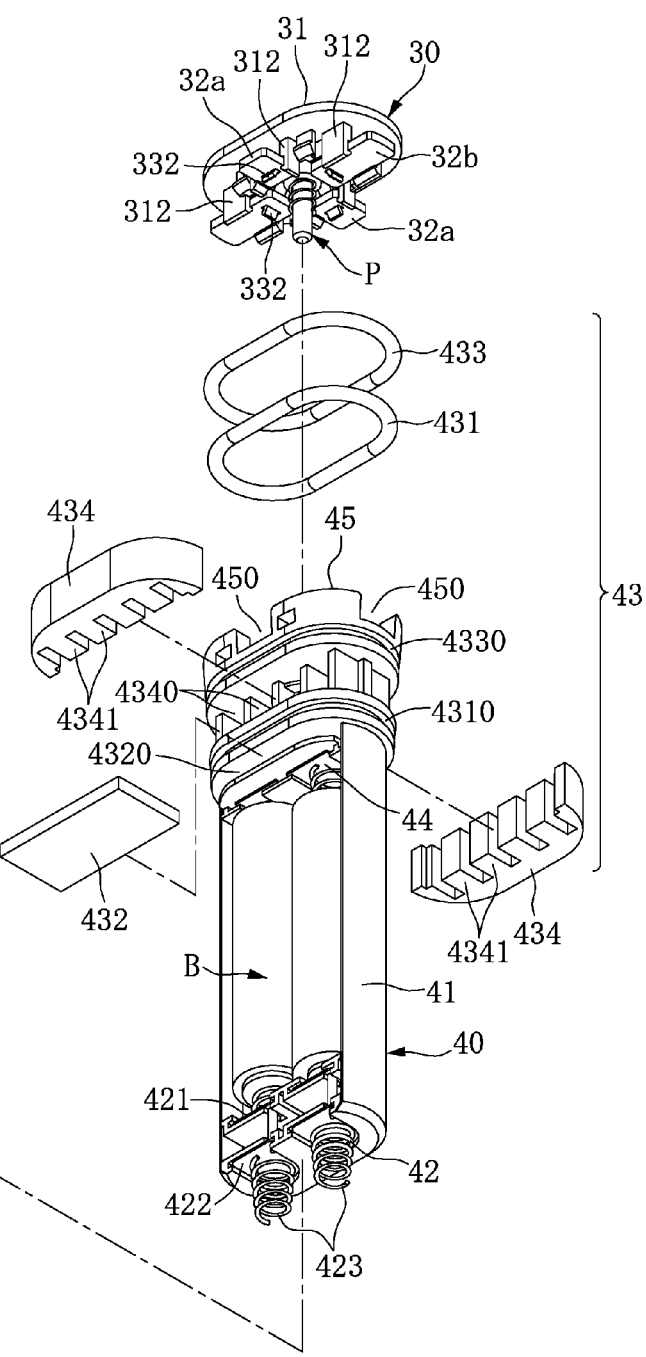

Refer to FIG. 4 and FIG. 5, which are further exploded views of the battery-accommodating waterproof container 100 of the present disclosure. The water-proofing section 43 includes a first sealing groove 4310, a first sealing-element 431 disposed in the first sealing groove 4310 and contacted tightly with an inner side of the housing 10, a plurality of partition portions 4340 adjacent to the first sealing groove 4310, and a pair of first absorbent elements 434 oppositely covered the partition portions 4340. The first sealing-element 431 could be an O-ring made of elastic plastic or rubber. Each first absorbent element 434 has a plurality of extension portions 4341, and the extension portions 4341 are extended into the partition portion 4340 correspondingly. The material of the first absorbent element 434 can be superabsorbent polymers (SAP), which is a water-soluble plastic with a very high absorption capacity and water-retaining capacity. Even it is pressed, the gel does not release liquid water. In addition, the effective chain length of grid structure of superabsorbent polymers preferably is $10^{-9}$ to $10^{-8}$ m, which has higher absorption capacity.

In this embodiment, the water-proofing section 43 is arranged close to the top-end portion 45, which includes a second sealing groove 4330, a second sealing-element 433 formed in the second sealing groove 4330 and tightly contacts an inner surface of the housing 10. The second sealing-element 433 could be, for example, an O-ring made of elastic plastic or rubber. The second sealing groove 4330 is formed at the other side of the partition portions 4340 opposite to the first sealing groove 4310. The water-proofing section 43 further has a water-storing room 4320, and a board-shaped second absorbent element 432, which are disposed close to the receiving portion 41. The water-storing room 4320 is formed between the first sealing groove 4310 and the battery-holding seat 40. The board-shaped second absorbent element 432 is received in the water-storing room 4320. The second absorbent element 432 preferably is made of superabsorbent polymers.

Refer to FIG. 4. The top-end portion 45 is formed with a plurality of cutouts 450, which are concaved from a top edge thereof and corresponding to the latching bolts 32a, 32b. The cutout 450 allows the latching bolts 32a, 32b to move therein, and provides the function for supporting the latching bolts 32a, 32b. In addition, the top-end portion 45 is formed with a plurality of supporting portions 451, which are correspondingly arranged under the latching bolts 32b, for supporting the latching bolts 32b.

Figure 6:
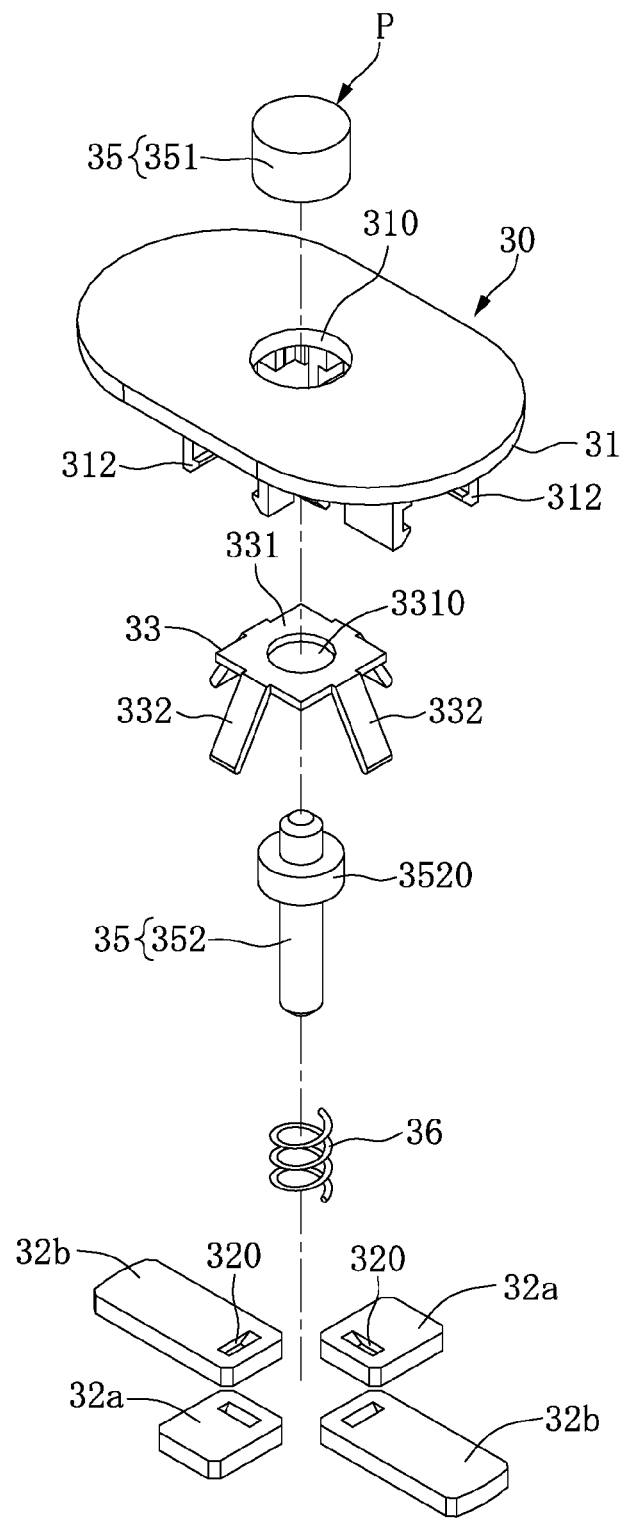
FIG. 6 is an exploded perspective view of a locking cover module of the waterproof accommodating structure for battery of the instant disclosure.
Figure 7:
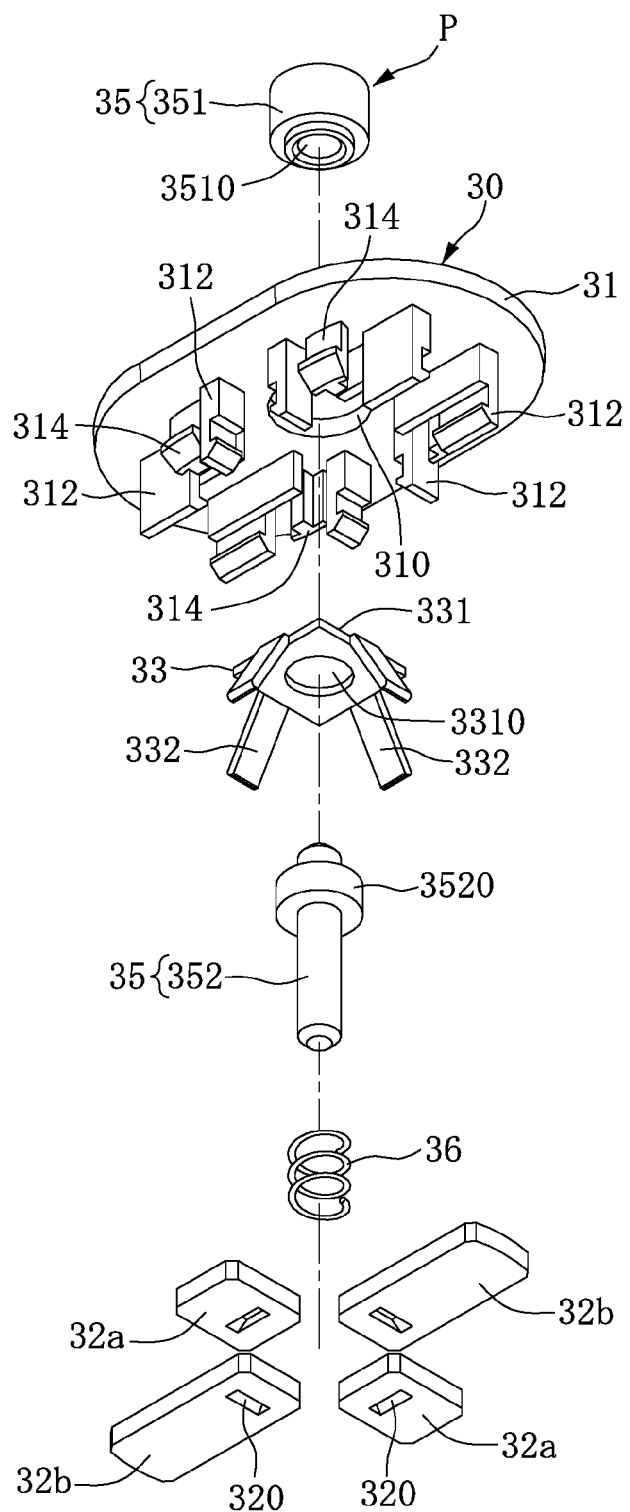
FIG. 7 is another exploded perspective view of the locking cover module of waterproof accommodating structure for battery of the instant disclosure.
Figure 8:
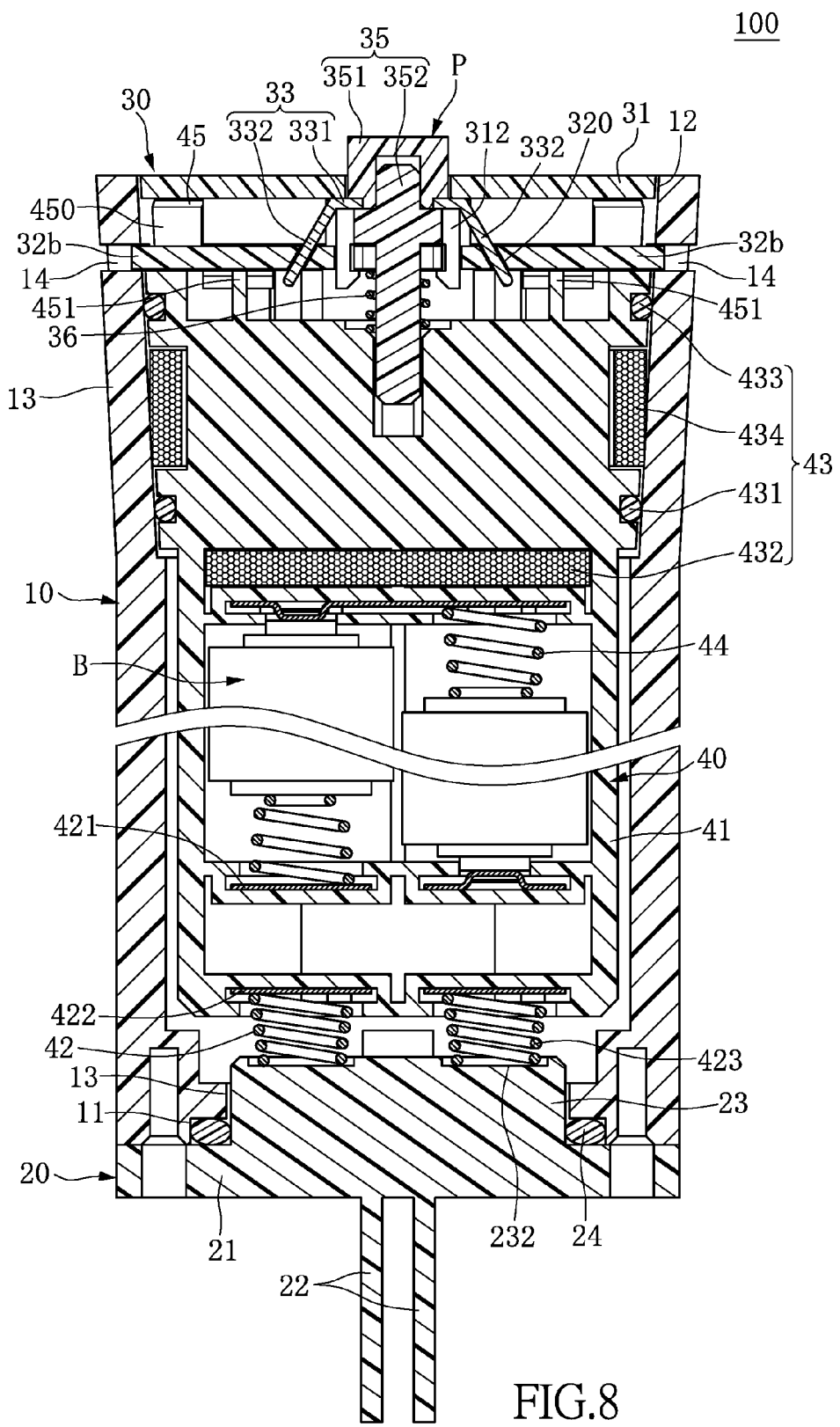
FIG. 8 is a cross-sectional view of the waterproof accommodating structure for battery in a locking condition of the instant disclosure.

Refer to FIG. 5 to FIG. 7. Concerning the details of the locking cover module 30, the pressing unit P has a plurality of oblique rods 332. The oblique rods 332 are movably disposed at an inner side of the covering lid 31 along a direction perpendicular to the covering lid 31. The covering lid 31 has a plurality of guiding portions 312 formed at a bottom surface thereof, which are used to guide the latching bolts 32a, 32b moving along a direction parallel to the covering lid 31. The latching bolts 32a, 32b normally are wedged in the wedging holes 14 (as shown in FIG. 8) of the housing 10. When the oblique rods 332 are pushed downward, the latching bolts 32a, 32b are obliquely guided and move away from a center of the locking cover module 30, and away from the wedging holes 14 (as shown in FIG. 9) of the housing 10.

Refer to FIG. 6 and FIG. 7, and FIG. 8 to FIG. 9 together. The pressing unit P further has a button-module 35 and an elastic element 36, which are passing through the central opening 310 of the covering lid 31. The oblique rods 332 are fixed on a periphery of the button-module 35. The elastic element 36 provides the button-module 35 restoring force, and keeps the latching bolts 32a, 32b normally in a position of extending outside. In this embodiment, the button-module 35 has a button 351, and a guiding rod 352 disposed under the button 351. The button 351 has a concaved portion 3510 formed at a bottom thereof. A top end of the guiding rod 352 is passing through the central opening 310 of the covering lid 31 and plugged in the concaved portion 3510. In this embodiment, in order to fix the oblique rods 332 to the periphery of the button-module 35, the pressing unit P has an oblique-pushing element 33. The oblique-pushing element 33 has a connecting board 331, and the oblique rods 332 are obliquely extended from an edge of the connecting board 331. The connecting board 331 is arranged between the button-module 35 and the guiding rod 352. In detail, the guiding rod 352 has a block ring 3520 formed as a periphery thereof. The connecting board 331 has a through hole 3310. The top end of the guiding rod 352 passes through the through hole 3310 and is wedged with the button 351. The block ring 3520 is contacted with a bottom surface of the connecting board 331.

In this embodiment, the locking cover module 30 is dismountably combined to the top-end portion 45 of the battery-holding seat 40. The advantage is that, after the locking cover module 30 is unlocked, the locking cover module 30 and the battery-holding seat 40 are ejected out of the housing 10 together. Concerning the above "dismountably combined" manner, the covering lid 31 has a plurality of hooks 314 on a bottom surface thereof, and the top-end portion 45 of the battery-holding seat 40 is formed with a plurality of latch sockets 452 (as shown in FIG. 4). The hooks 314 (as shown in FIG. 7) are engaged in the latch sockets 452.

Figure 9:
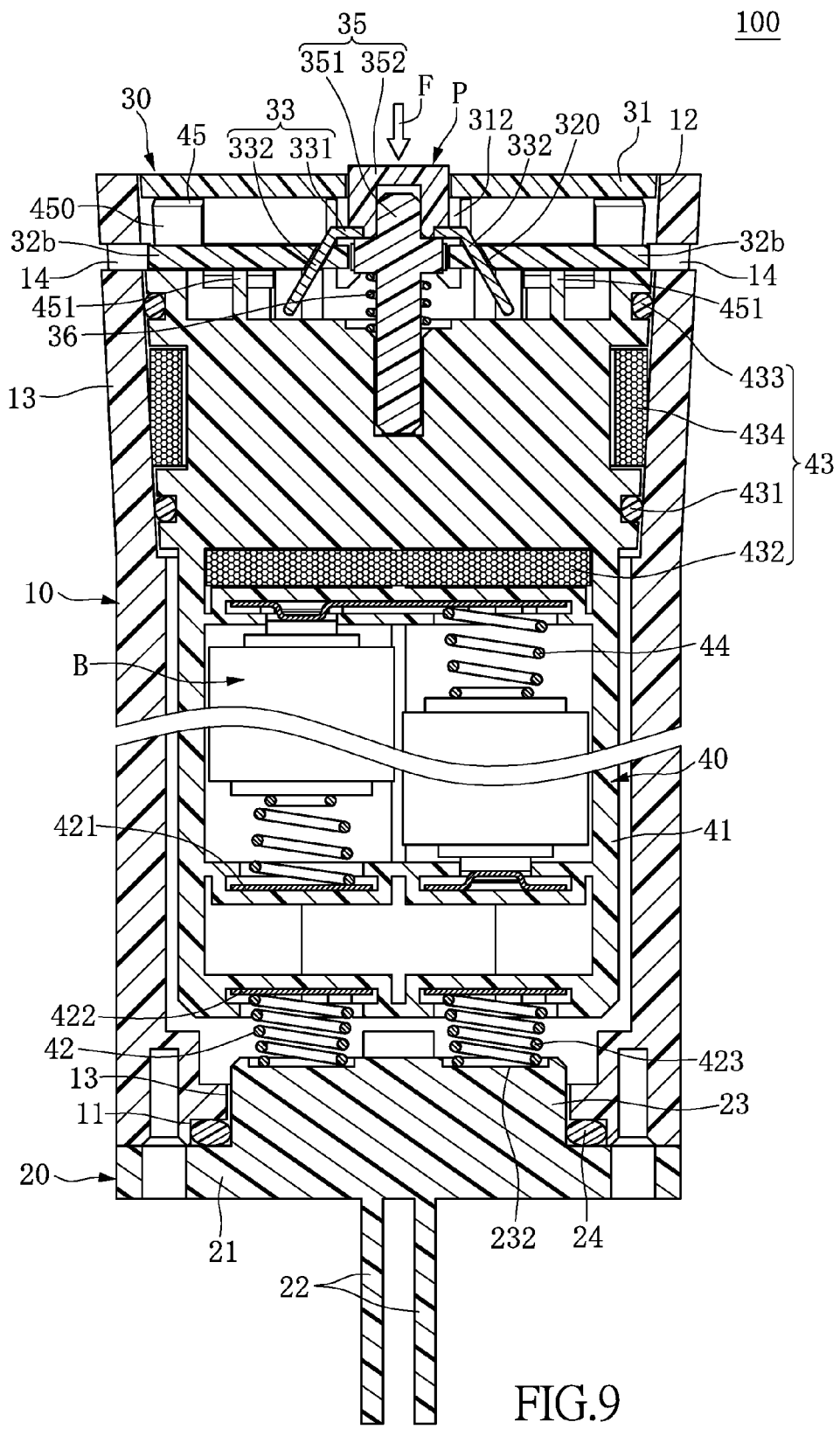
FIG. 9 is a cross-sectional view of the waterproof accommodating structure for battery in an unlocking condition of the instant disclosure.

Refer to FIG. 8 and FIG. 9, which are cross-sectional views of a locking cover module of the waterproof accommodating container for a battery of the present disclosure. In this embodiment, the battery-accommodating waterproof container 100 has multiple measures of waterproofing designs. First, for the first opening 11 at the bottom of the housing 10, the base-sealing element 24 of the transmission seat 20 can block moisture from entering into the housing 10. For the second opening 12 at the top end of the housing 10, firstly, the locking cover module 30 is covered on the second opening 12. If liquid accidently flows into the second opening 12, it still has multiple measures of waterproofing and absorbance. The first measure is that, the second sealing-element 433 is contacted against an inner surface of the housing 10 for blocking liquid. The second measure is that, the first absorbent element 434 fully surrounds the periphery of the battery-holding seat 40 for absorbing liquid. The third measure is that, the first sealing-element 431 is used to block liquid. Even if liquid is flowed to the receiving portion 41, a top end of the receiving portion 41 further provides the second absorbent element 432.

Refer to FIG. 8, which shows the battery-holding seat 40 is assembled in the housing 10, the elastic transmit-element 423 is compressed and an elastic force is accumulated. As shown in FIG. 9, if want to unlock the locking cover module 30 relative to the housing 10, an external force F is continuously exerted to the pressing unit P, and the latching bolts 32a, 32b move inward along the oblique rod 332 away from the wedging holes 14 of housing 10. In the meanwhile, an elastic force is exerted by the elastic transmit-elements 423 to push the battery-holding seat 40 away from the housing 10, so that a user can take out the battery-holding seat 40. The locking cover module 30 and the battery-holding seat 40 are ejected out of the housing 10 at the same time, so as to avoid losing the locking cover module 30 accidently.

Refer to FIG. 8, which shows the condition of the external force F is released from the button-module 35. In the meanwhile, the elastic element 36 provides the button-module 35 a restoring force for pushing the oblique rod 332 upward, and the latching bolts 32a, 32b are moved outward along the oblique rod 332 to engage into the wedging holes 14 of the housing 10. The waterproof accommodating structure 100 is restored to a locking condition. The locking process of the present disclosure is effortless. Since the housing 10 has the oblique portion 13, the latching bolts 32a, 32b can slide downward along an inner slanted surface of the oblique portion 13 until entering into the wedging holes 14. During the locking process, it is effort-saving, and it does not need to press the pressing unit P continuously.

The description above only illustrates specific embodiments and examples of the instant disclosure. The instant disclosure should therefore cover various modifications and variations made to the herein-described structure and operations of the instant disclosure, provided they fall within the scope of the instant disclosure as defined in the following appended claims.

What is claimed is:

1. A waterproof accommodating structure for a battery, comprising:
    a housing, being hollow, having a first opening, a second opening opposite to the first opening, and a plurality of wedging holes close to the second opening;
    a transmission seat, fixed to the first opening of the housing, having a base board, an electricity transferring seat disposed on the base board, and a base-sealing element disposed between the base board and the housing;
    a battery-holding seat, received in the housing, the battery-holding seat has a receiving portion for receiving at least one battery, a output terminal set is arranged at one end of the receiving portion, a water-proofing section arranged at the other end of the receiving portion, and a top-end portion connected to the water-proofing section; wherein the electricity transferring seat electrically connecting to the output terminal set and transmit electrical power out of the transmission seat; and
    a locking cover module, disposed on the second opening of the housing and contacted with the top-end portion, the locking cover module having a covering lid, a plurality of latching bolts movably disposed under the covering lid, and a pressing unit passing through the covering lid, wherein the pressing unit drives the latching bolts to wedge into the wedging holes of the housing, so as to block the battery-holding seat in the housing.

2. The battery-accommodating waterproof container as claimed in claim 1, wherein the output terminal set further includes at least one elastic transmit-element disposed at a bottom of the battery-holding seat and elastically against the electricity transferring seat; thereby when the locking cover module is unlocked relative to the housing, the at least one elastic transmit-element pushes the battery-holding seat away from the housing.

3. The battery-accommodating waterproof container as claimed in claim 2, wherein the at least one elastic transmit-element is electrically connected to the electricity transferring seat and the output terminal set.

4. The battery-accommodating waterproof container as claimed in claim 3, wherein the transmission seat has a plurality of terminals fixed in the electricity transferring seat, and a wire set arranged at an outside of the base board and electrically connected to the terminals, wherein the terminals are contacted with the at least one elastic transmit-element.

5. The battery-accommodating waterproof container as claimed in claim 1, wherein the battery-holding seat further includes a transit-terminal set disposed at the other end of the receiving portion.

6. The battery-accommodating waterproof container as claimed in claim 1, wherein the water-proofing section includes a first sealing groove, a first sealing-element disposed in the first sealing groove and tightly contacted with an inner surface of the housing, a plurality of partition portions close to the first sealing groove, and a pair of first absorbent elements oppositely surrounding the partition portions, each of the first absorbent elements has a plurality of extension portions, the extension portions correspondingly extended into the partition portions.

7. The battery-accommodating waterproof container as claimed in claim 6, wherein the water-proofing section further includes a second sealing groove formed at one side of the partition portions and opposite to the first sealing groove, a second sealing-element disposed in the second sealing groove and tightly contacting with an inner surface of the housing, a water-storing room formed between the first sealing groove and the battery-holding seat, and a second absorbent element received in the water-storing room.

8. The battery-accommodating waterproof container as claimed in claim 1, wherein the pressing unit further includes a plurality of oblique rods movably arranged at an inner side of the covering lid along a direction perpendicular to the covering lid, wherein the covering lid has a plurality of guiding portions at a bottom surface thereof, the guiding portions respectively guides the latching bolts to move along a direction parallel to the covering lid, whereby the oblique rods push the latching bolts to wedge into the wedging holes of the housing.

9. The battery-accommodating waterproof container as claimed in claim 8, wherein the pressing unit further has a button-module passing through the covering lid and an elastic element, wherein the oblique rods are fixedly arranged at a periphery of the button-module, the elastic element provides the button-module a restoring force.

10. The battery-accommodating waterproof container as claimed in claim 9, wherein the button-module includes a button, and a guiding rod disposed under the button, wherein the pressing unit has an oblique-pushing element, the oblique-pushing element having a connecting board, the oblique rods are obliquely extended from an edge of the connecting board, wherein the connecting board is arranged between the button-module and the guiding rod.

11. The battery-accommodating waterproof container as claimed in claim 10, wherein the guiding rod has a block ring formed at a periphery thereof, the connecting board has a through hole, a top end of the guiding rod passing through the through hole and engaged with the button, the block ring contacted with a bottom surface of the connecting board.

12. The battery-accommodating waterproof container as claimed in claim 1, wherein the covering lid has a plurality of hooks formed at a bottom surface thereof, the top-end portion of the battery-holding seat is formed with a plurality of latch sockets.

13. The battery-accommodating waterproof container as claimed in claim 1, wherein the housing further includes a testing hole, and a sealing pad covered on the testing hole.

\* \* \* \* \*